(12) United States Patent
Rinker et al.

(10) Patent No.: US 10,031,499 B2
(45) Date of Patent: Jul. 24, 2018

(54) MICRO HEAT EXCHANGERS FOR CONTROLLING TEMPERATURE OF WORKPIECES BEING JOINED BY WELDING

(71) Applicant: GM Global Technology Operations LLC, Detroit, MI (US)

(72) Inventors: Teresa J. Rinker, Royal Oak, MI (US); Debejyo Chakraborty, Novi, MI (US); Ryan C. Sekol, Grosse Pointe Woods, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 15/017,106

(22) Filed: Feb. 5, 2016

(65) Prior Publication Data

US 2016/0231061 A1 Aug. 11, 2016

Related U.S. Application Data

(60) Provisional application No. 62/112,629, filed on Feb. 5, 2015.

(51) Int. Cl.
*G05D 11/00* (2006.01)
*G05D 11/02* (2006.01)
(Continued)

(52) U.S. Cl.
CPC .............. *G05B 15/02* (2013.01); *B82Y 30/00* (2013.01); *F28F 2013/001* (2013.01); *F28F 2260/02* (2013.01); *Y10S 977/786* (2013.01)

(58) Field of Classification Search
CPC ......... B29C 65/18; B29C 65/00; B29C 66/71; F28F 1/42; F28F 19/06; F28F 21/08; F28F 21/062; B23P 15/26
(Continued)

(56) References Cited

U.S. PATENT DOCUMENTS 8,541,875 B2 9/2013 Bennion et al.
8,968,820 B2 3/2015 Zhamu et al.
(Continued)

OTHER PUBLICATIONS

Carlos F. Lopez et al., "Exploring the Efficacy of Nanofluids for Thermal Management in Lithium-Ion Battery Systems", May 14, 2014, ECS Meeting Abstracts, ECS Digital Library.
(Continued)

*Primary Examiner* — Michael J Brown
(74) *Attorney, Agent, or Firm* — Cynthia R. Parks; Parks IP Law LLC

(57) ABSTRACT

A thermal-management system, for use in controlling temperature of a first workpiece of workpieces being joined by welding. The system includes a micro heat exchanger including a heat-transfer fluid tube extending between an inlet and an outlet. The system in some implementations has a body and the inlet and outlet are connected to the body. The heat-transfer fluid tube is configured to channel heat-transfer fluid, such as a nanofluid, to heat or cool the workpiece(s). The heat-transfer fluid is configured to cool or heat at least the first workpiece when the heat-transfer fluid is channeled through the heat-transfer fluid-tube section in operation of the thermal-management system. The technology further includes methods and hardware-based controlling apparatus for using the micro heat exchanger to cool or heat the workpieces.

19 Claims, 6 Drawing Sheets

(51) Int. Cl.
G05B 15/02 (2006.01)
B82Y 30/00 (2011.01)
F28F 13/00 (2006.01)
(58) Field of Classification Search
USPC .......................................................... 700/282
See application file for complete search history.

(56) References Cited

U.S. PATENT DOCUMENTS

| | | | | |
|---|---|---|---|---|
| 2003/0221783 | A1* | 12/2003 | Evans | B29C 65/1432 |
| | | | | 156/359 |
| 2009/0305135 | A1 | 12/2009 | Shi et al. | |
| 2010/0176182 | A1* | 7/2010 | Hanlon | B23K 20/1245 |
| | | | | 228/2.1 |
| 2012/0186789 | A1 | 7/2012 | Sedarous et al. | |

OTHER PUBLICATIONS

Yang Li et al., "Liquid Cooling of Tractive Lithium Ion Batteries Pack with Nanofluids Coolant", Journal of Nanoscience and Nanotechnology, Apr. 4, 2015, pp. 3206-3211, vol. 15, No. 4, American Scientific Publishers.
"Virtual Hybrid Battery System", Impact Lab, Jun. 29, 2013.
Else Tennessen, "Nanofluids improve performance of vehicle components", Argonne National Laboratory, Mar. 9, 2012.
"Smart heating and cooling with nanofluids", Innovations Report, Forum for Science, Industry and Business, Mar. 12, 2009.
Ali Ijam et al., Nanofluid as a coolant for electronic devices (cooling of electronic devices), ScienceDirect, Applied Thermal Engineering, Jan. 2012, pp. 76-82, vol. 32.
P. Sivashanmugam, "Application of Nanofluids in Heat Transfer", InTech.
B. Kirubadurai et al., "Heat Transfer Enhancement of Nano Fluids—A Review", IJRET: International Journal of Research in Engineering and Technology, Jul. 2014, pp. 483-486, vol. 3, No. 7.
Li Jiang et al., "Thermo-Mechanical Reliability of Nano-Silver Sintered Joints versus Lead-Free Solder Joints for Attaching Large-Area Silicon Devices", SAE International, Nov. 2, 2010.
D. Shin et al., "Enhanced Specific Heat Capacity of Molten Salt-Metal Oxide Nanofluid as Heat Transfer Fluid for Solar Thermal Applications", SAE International, Nov. 2, 2010.
G. Huminic et al., "The Cooling Performances Evaluation of Nanofluids in a Compact Heat Exchanger", SAE International, Apr. 16, 2012.
"Nanofluid Tapped to Cool Servers", Electronics Cooling, Liquid Cooling, Sep. 14, 2010.
Saeil Jeon et al., "Investigation of Thermal Characteristics of Nanofluids During Flow in a Micro-channel Using an Array of Surface Temperature-Nano-Sensors", SAE International, Nov. 2, 2010.
Robert P. Scaringe et al., "The Heat Transfer Effects of Nanotube Surfaces Treatments and a Means for Growing the Nanotube Coated Surfaces", SAE International, Nov. 7, 2006.
J.R. Patel et al., "Effect of Nanofluids and Mass Flow Rate of Air on Heat Transfer Rate in Automobile Radiator by CFD Analysis", IJRET: International Journal of Research in Engineering and Technology, Jun. 2014, p. 25, vol. 3, No. 6.
Purna Chandra Mishra et al., "Application and Future of Nanofluids in Automobiles: An Overview on Current Research", ResearchGate, 2nd KIIT International Symposium on Advances in Automotive Technology.
Yi-Hsuan Hung et al., "Multiwalled Carbon Nanotube Nanofluids Used for Heat Dissipation in Hybrid Green Energy Systems", Journal of Nanomaterials, 2014, Hindawi Publishing Corporation.
Ching-Song Jwo et al., "Performance of Overall Heat Transfer in Multi-Channel Heat Exchanger by Alumina Nanofluid", ScienceDirect, Elsevier, Journal of Alloys and Compounds, Aug. 2010, pp. S385-S388, vol. 504, Supplement 1.
"Powertrain Thermal Management", Automotive Research Center, A U.S. Army Center of Excellence for Modeling and Simulation of Ground Vehicles led by the University of Michigan, pp. 1-2.
Nazih A. Bin-Abdun et al., "The Performance of a Heat Exchanger Designed for Cooling Electric Vehicle Car Battery System by Use Base Fluid and Nano-Fluid", ResearchGate, Mar. 2015.
"Experimental Thermal and Fluid Science", ScienceDirect, Sep. 2014, pp. 1-434, vol. 57.
"FleX Silicon-on-Polymer", American Semiconductor, Apr. 16, 2016, pp. 1-5, Abstract Only.
Joachim N. Burghartz, "Make Way for Flexible Silicon Chips", IEEE Spectrum, Feb. 25, 2013, pp. 1-7, Abstract Only.
Jhonathan Prieto Rojas et al., "Transformational Silicon Electronics", ACS Publications, Jan. 29, 2014, pp. 1468-1474, Abstract Only.
Debendra K. Das et al., "Performance of Nanofluids in Microchannel Heat Exchangers", Abstract Only.

* cited by examiner

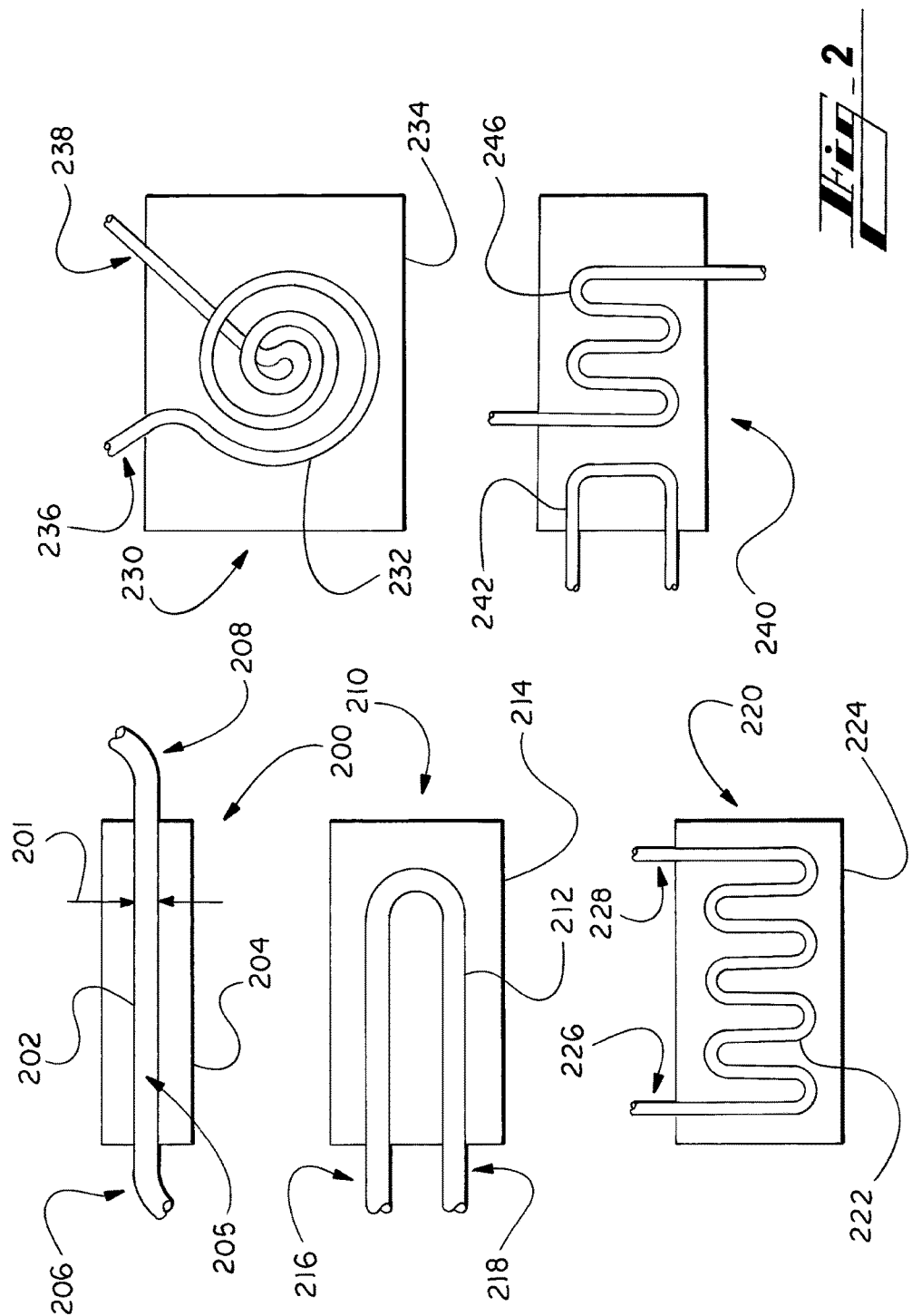
Fig_2

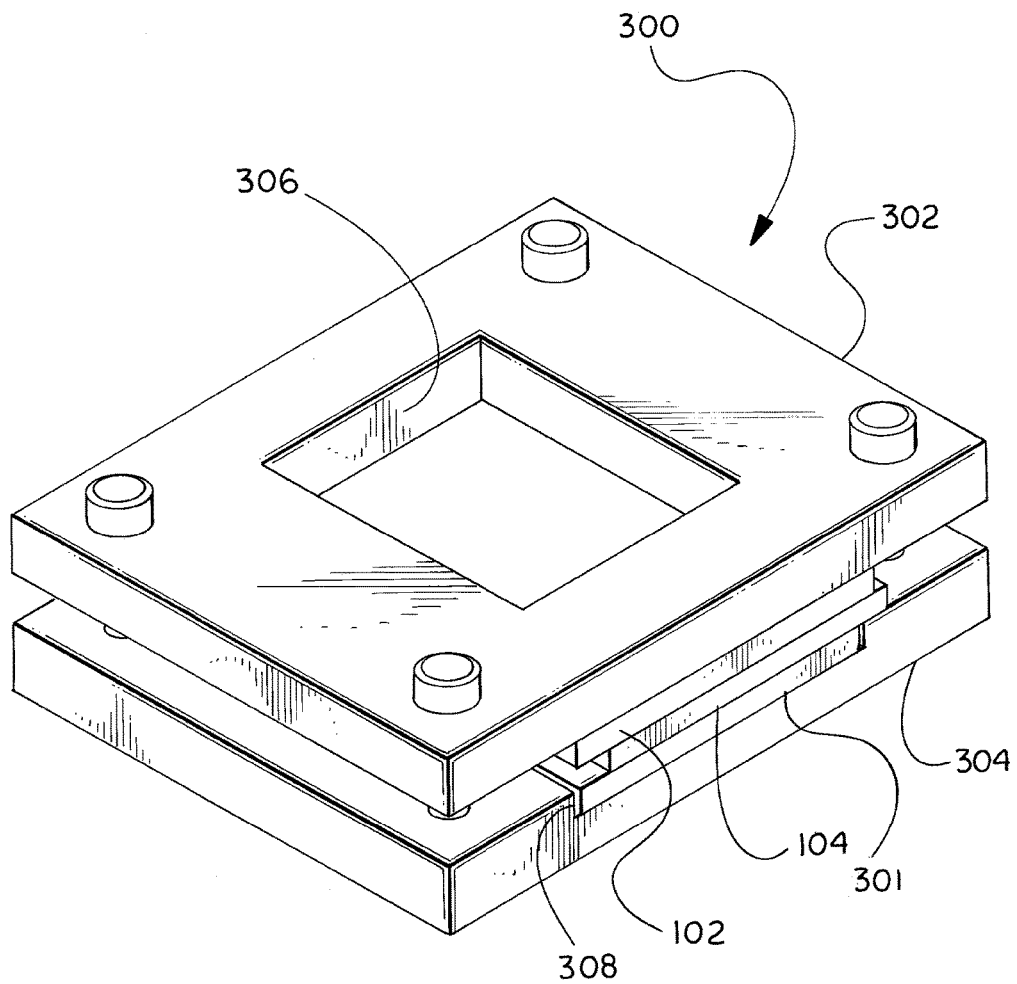
Fig_3

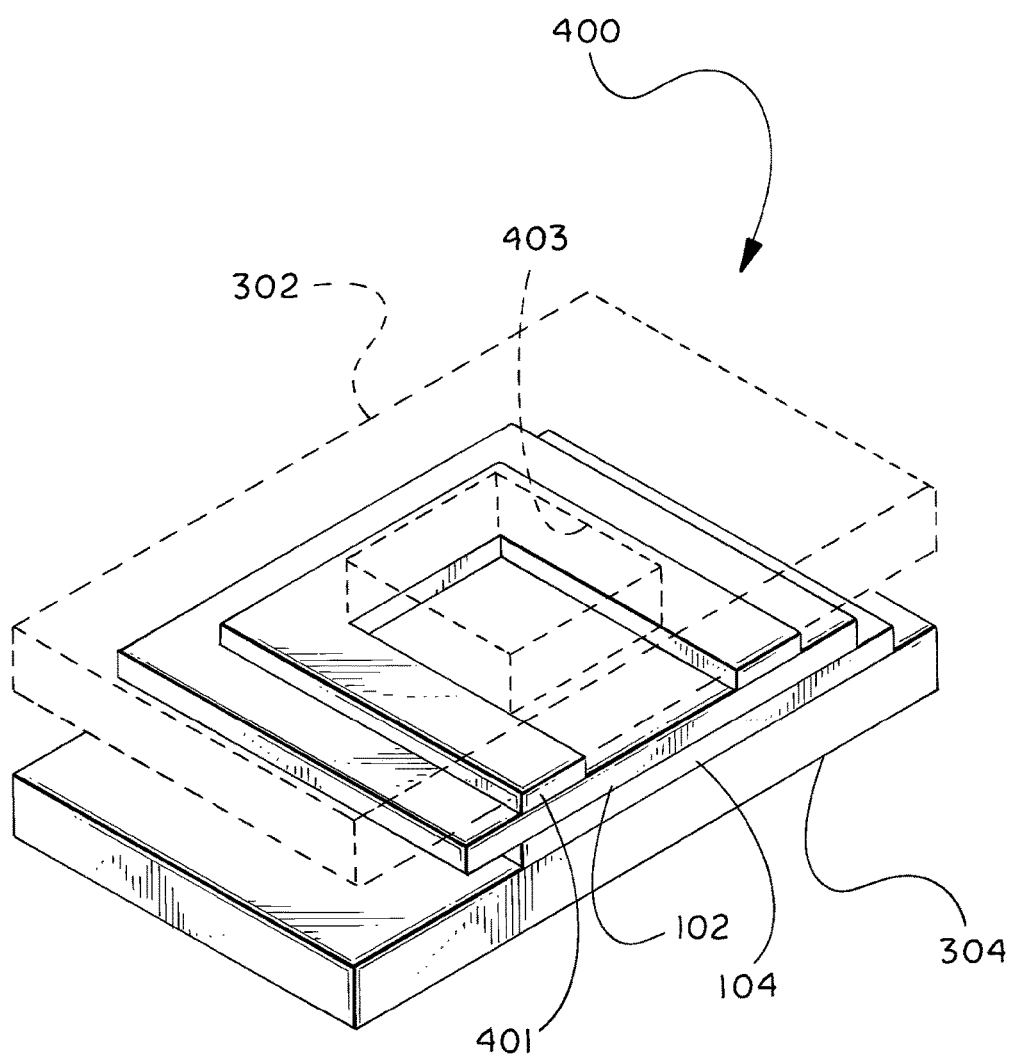
Fig_4

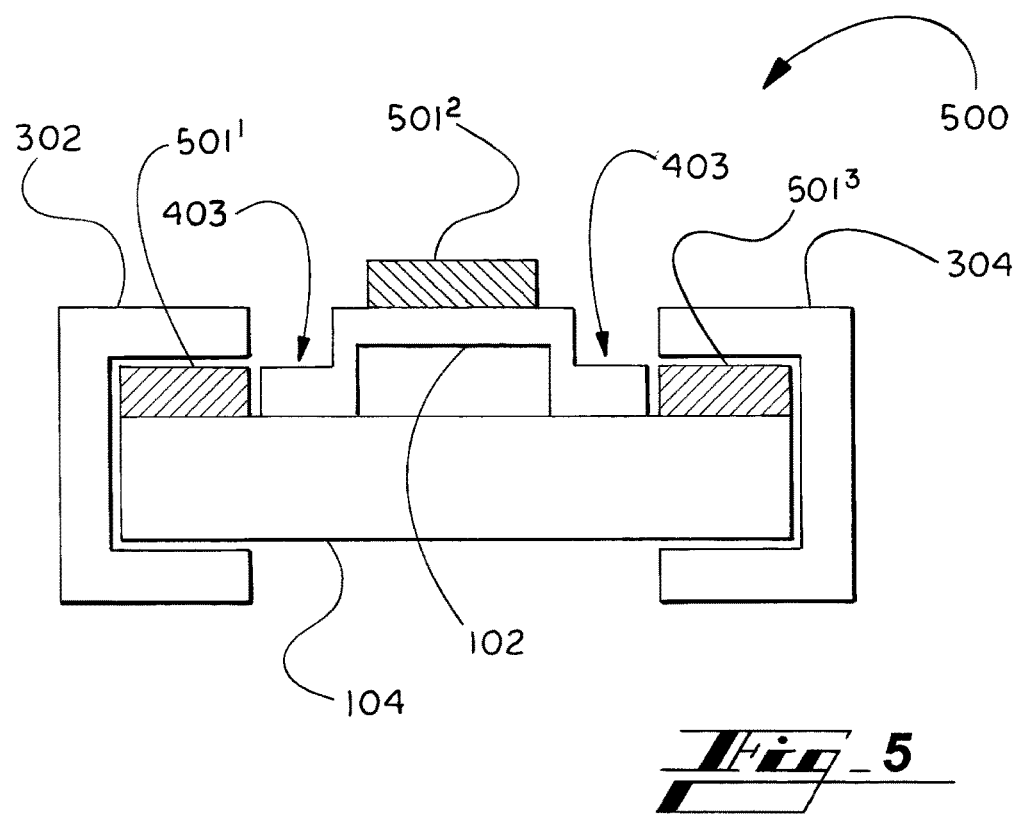
*Fig_5*
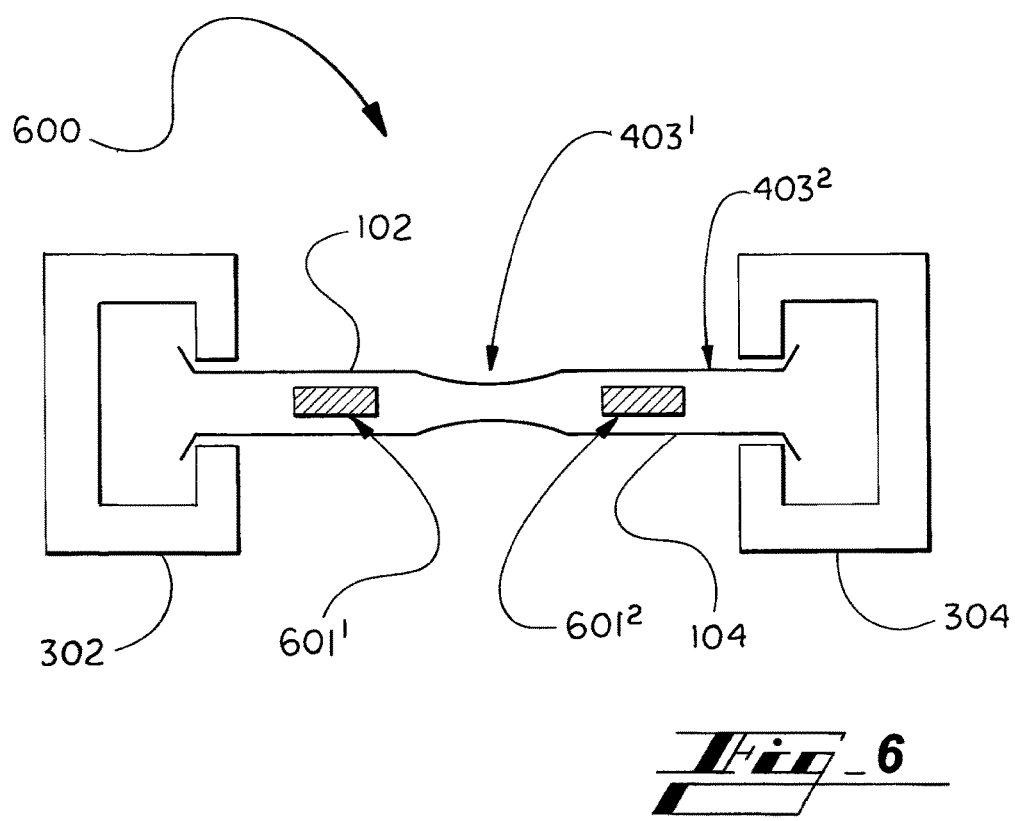
*Fig_6*

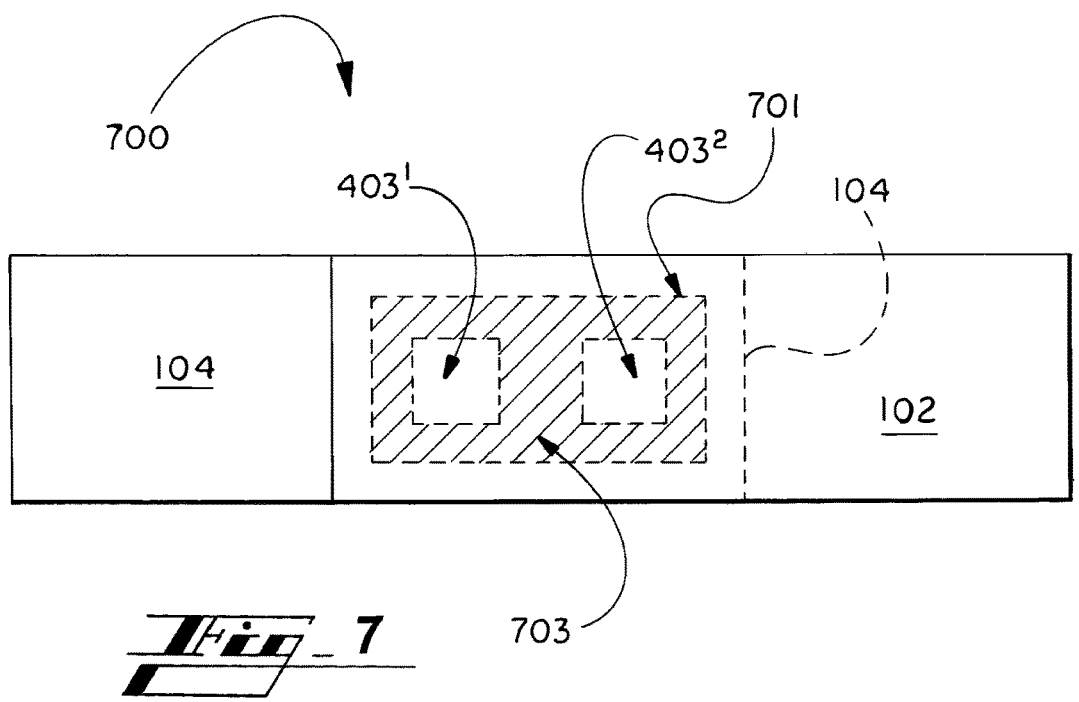
_Fig_7
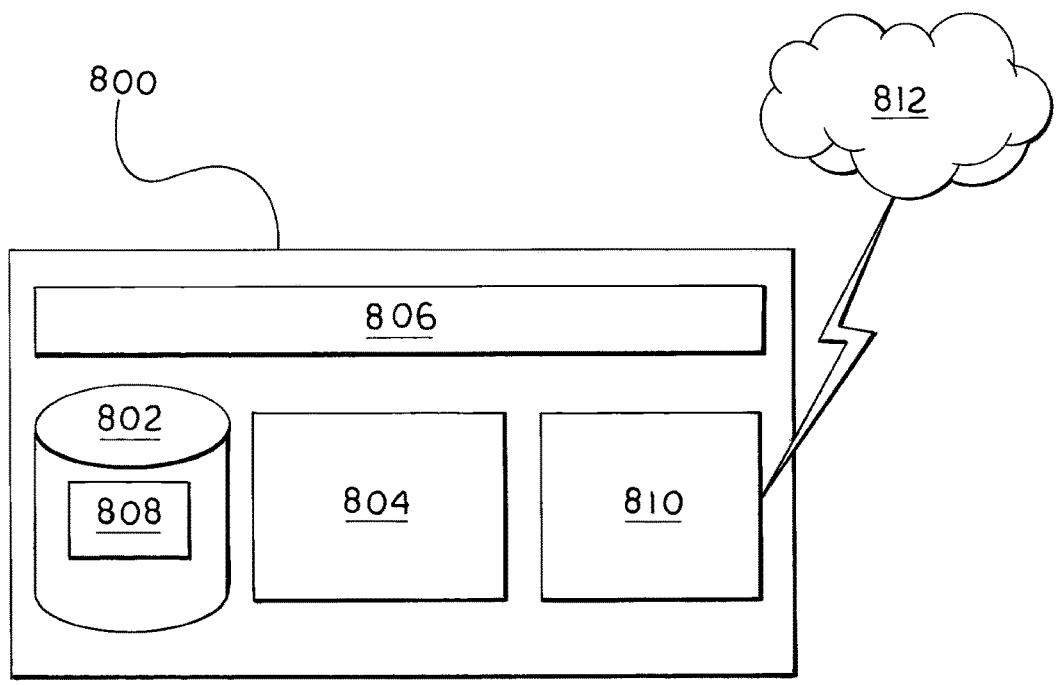
_Fig_8

MICRO HEAT EXCHANGERS FOR CONTROLLING TEMPERATURE OF WORKPIECES BEING JOINED BY WELDING

TECHNICAL FIELD

The present technology relates generally to systems for controlling temperature of workpieces being joined, and more particularly to micro heat-exchange systems using a heat-transfer fluid, such as a nanofluid, to control temperature of workpieces being joined or recently joined by welding.

BACKGROUND

Welding is a common way to join similar and dissimilar materials in a wide range of industries, including consumer electronics, home products and appliances, farming, construction equipment, transportation systems, and the like.

The dissimilar materials can include dissimilar metals, dissimilar polymers, or combinations of polymers and metals. The manufacturer can select favorable characteristics, such as being lightweight, highly-conformable or shapeable, strong, durable, or having a desired texture or color by combining some polymer or composite materials with other materials. An article of manufacture may include various components (exterior, interior, or decorative features) where materials are selected and configured to withstand a hot and/or chemically aggressive environment or for painting or chemical resistance over time.

With the increased use of polymers and other low-mass materials, compression molding and post-mold joining techniques, such as laser welding and ultrasonic welding, are also being used more commonly. Some workpieces, including polymer composites, have relatively low melting points, and some workpieces, including metals, have relatively high conductivity. Whether welding one or both types of workpiece, it is difficult and in many cases impossible to join the workpieces at a target interface accurately, quickly, and with minimal melting of other portions of the workpieces.

In addition, some conventional approaches require undesirably high welding cycle times, including time to make the weld. Conventional welding techniques also lack means to rapidly heat workpieces being joined or cool workpieces recently joined, or at least a joined interface—that is, by a significant degree of temperature in a short amount of time. Moreover, conventional welding equipment, itself, would benefit from an improved heating and/or cooling system, configured and arranged to heat or cool at least one component of the equipment becoming heated during operation.

SUMMARY

The present technology relates to systems and methods for controlling temperature of workpieces being joined by welding. Selective cooling and/or heating of the workpieces is effected using a micro heat exchanger.

The micro heat exchanger includes or uses nanofluid, or other suitable heat-transfer fluid, for which a temperature and/or other characteristic is controlled to promote super cooling or super heating of the workpieces. The fluid is preferably a nanofluid in some implementations, but can be other fluids including traditional coolants or refrigerants.

While nanofluids are discussed herein as the primary fluid for use in the present systems, other fluids having characteristics for performing suitably can be used. The fluids can include known coolants or refrigerants, or microfluids, for instance. The term microfluid can refer generally to fluids having micro-sized particles mixed or suspended in a base fluid, or simply fluids capable of effective movement through one or more micro channels, such as those of the micro heat exchangers of the present technology.

In some heating implementations, at least one of the workpieces is heated by thermal energy flowing from the heated fluid to at least one wall of the fluid-holding channel of the micro heat exchanger fluid channel, such as by conduction, and thermal energy passing in turn from the wall of the fluid-holding channels heated to the workpiece, also by conduction and/or any of convention, radiation, or any combination of these, depending on the arrangement.

Heating one or both of the two workpieces being joined has benefits including facilitating increased internal energy or melting of the workpieces, and any implements (e.g., one or more energy directors), at and/or adjacent a welding interface in the welding process.

By one or more micro heat exchangers, one or both workpieces can be pre-heated, for example, thereby reducing an amount of temperature rise that needs to be effected by the welding head—e.g., laser head or ultrasonic welding head—for bonding the material to form a connecting weld joint.

In various embodiments, one of the workpieces can be directly heated or cooled by the heat exchanger, such as by direct contact with the exchanger, while the other is heated or cooled indirectly, still due to operation of the exchanger but by way of another element such as the other workpiece, the two workpieces being in contact.

In one embodiment, at least one of the workpieces is cooled by relatively cool or cold fluid passing through the micro heat exchanger. The implementation includes the micro heat exchanger being positioned adjacent—e.g., in contact with or at least closely near—one or both workpieces.

In some cooling implementations, the workpiece is cooled by thermal energy flowing from one or both workpieces to a wall or walls of at least one cold-fluid-holding channels of the micro heat exchanger. Thermal energy is transferred further from the wall(s) to the cold fluid passing through the micro heat exchanger channel(s). The fluid may flow to the walls by conduction and/or any of convention, radiation, or any combination of these depending on the arrangement, and from the wall(s) to the cold fluid by conduction, for example.

Cooling one or both of the two workpieces joined has benefits including avoiding one or both workpieces becoming damaged by overheating, or being heated too long.

Cooling the workpieces can also expedite manufacturing, such as by allowing moving of the workpieces more quickly to a subsequent stage of the manufacturing process and further working the workpieces at the next stage, whether at the same location as the welding location.

In some welding scenarios, depending for example on the material forming the weld joint, active, rapid cooling immediately after welding strengthens the joint formed or being formed, resulting in a bond stronger than would be formed if the newly formed joint were allowed to cool slowly.

In implementations in which the workpieces include different metals, rapid cooling after welding reduces intermetallic compound formation, or growth. Intermetallic compounds commonly form while joining dissimilar metals and grow thicker as time passes at higher temperatures. Generally intermetallic compounds have low ductility, low conductivity, and thus degrade the quality of the joint.

In one implementation, a first portion of a workpiece is heated by hot or warm fluid running through a micro heat exchanger positioned adjacent the workpieces while a second portion of the workpiece is cooled by cold or cool fluid running through the same or different micro heat exchanger positioned adjacent the workpiece.

In another aspect, the technology is configured to cool welding equipment using a relatively cold nanofluid passing through a channel of a micro heat exchanger positioned adjacent the welding equipment. An example welding-equipment component to be cooled, or chilled, is a welding head. In operation of a fusion- or laser-type welding apparatus, for instance, a laser head heats while emitting laser rays for forming the weld. Without sufficient cooling, performance of the head could degrade and/or a life of the welding equipment or component could be shortened.

Other aspects of the present invention will be in part apparent and in part pointed out hereinafter.

DESCRIPTION OF THE DRAWINGS

FIG. 2 illustrates schematically examples of channeling configurations for use with any of the micro heat exchangers of the present technology.

FIGS. 3 and 4 illustrate schematically perspective views of thermal-management systems comprising micro heat exchangers according to other embodiments of the present technology.

FIG. 5 illustrates schematically a side view of a thermal-management system comprising a micro heat exchanger according to another embodiment of the present technology.

FIG. 6 illustrates schematically a perspective view of a thermal-management system comprising a micro heat exchanger according to another embodiment of the present technology.

FIG. 7 illustrates schematically a top plan view of a thermal-management system comprising a micro heat exchanger according to another embodiment of the present technology.

FIG. 8 illustrates an example controller, for controlling functions related to a thermal-management system, according to an embodiment of the present technology.

Figure 1:
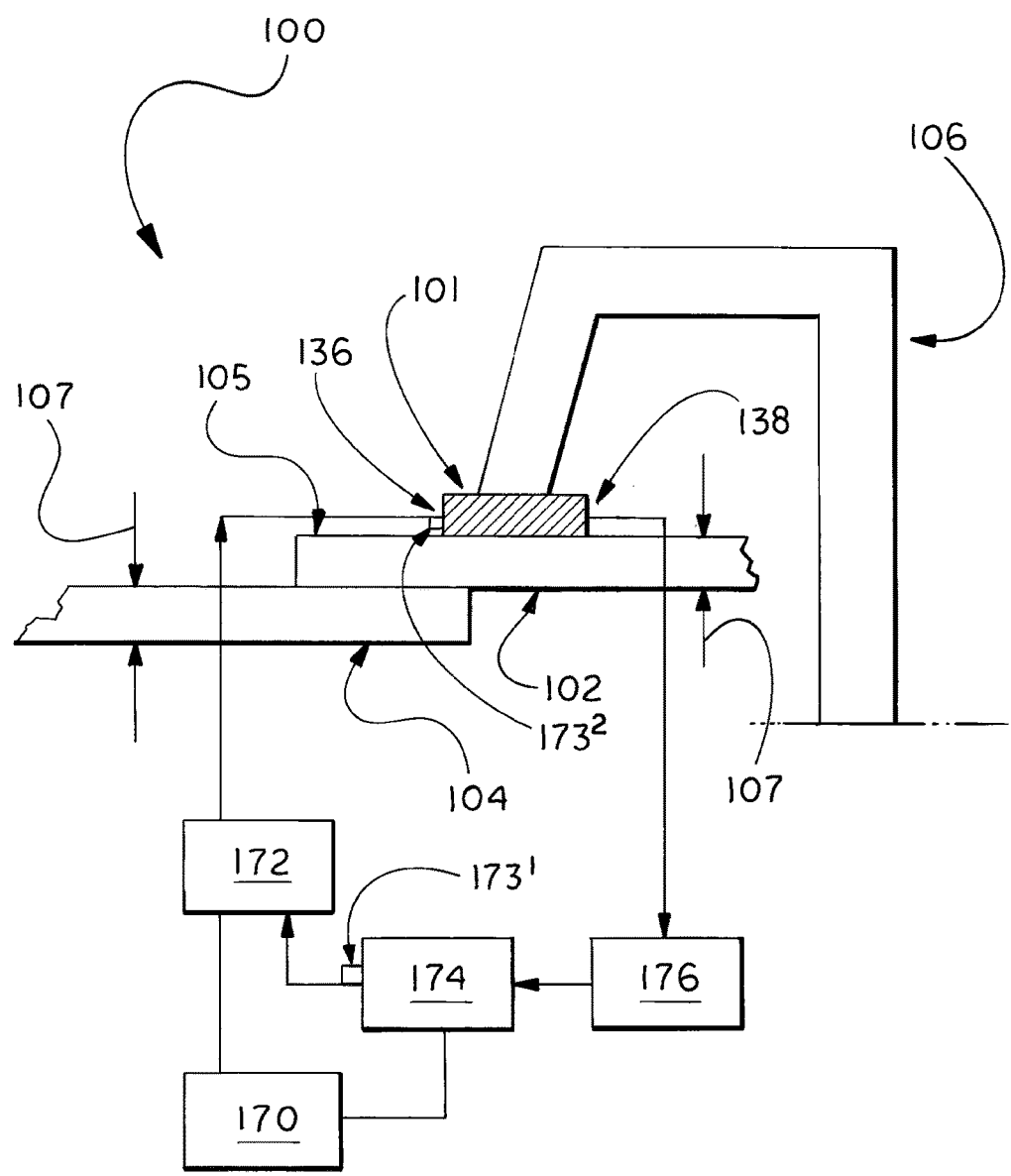
FIG. 1 illustrates schematically a side view of a thermal-management system comprising a micro heat exchanger according to an embodiment of the present technology.

The figures are not necessarily to scale and some features may be exaggerated or minimized, such as to show details of particular components. In some instances, well-known components, systems, materials or methods have not been described in detail in order to avoid obscuring the present technology.

Specific structural and functional details disclosed herein are not to be interpreted as limiting, but merely as a basis for the claims and as a representative basis for teaching one skilled in the art to variously employ the present technology.

DETAILED DESCRIPTION

As required, detailed embodiments of the present technology are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

While the present technology is described primarily herein in connection with automobiles, the technology is not limited to automobiles. The concepts can be used in a wide variety of applications, such as in connection with aircraft, marine craft, and non-vehicle industries including consumer good and electronics, and other.

I. GENERAL OVERVIEW OF THE DISCLOSURE

The present technology describes systems and methods for using micro heat exchangers to control temperature of (a) workpieces being joined by welding, (b) inter-welding structure (e.g., energy directors), and/or (c) welding equipment. The micro heat exchangers cool and/or heat the workpieces using a nanofluid, or other suitable fluid. While nanofluid is described primarily as the applicable fluid in embodiments herein, any embodiment described can be implemented with another suitable fluid to achieve the stated purposes and goals.

Exemplary types and engineering of fluids that can be used with the present technology are described further below, in the example fluids section (section XI.) below.

II. FIGS. 1 AND 2

FIG. 1 illustrates schematically a side view of a thermal-management system 100 comprising a micro heat exchanger (MHE) 101 according to an embodiment of the present technology.

The thermal-management system 100 can also be referred to as a thermal-control system, a temperature-control system, a temperature-management system, or the like.

In various embodiments, the thermal-management system 100 controls or manages temperature of workpieces before, during, and/or after they are welded together.

The MHE 101 is configured and arranged to heat and/or cool at least a first, or upper, workpiece 102 being joined by welding to a second, or lower, workpiece 104. Additional structure can be used to facilitate welding, such as energy directors (not shown in detail) positioned between the workpieces 102, 104 at or adjacent a welding area 105.

References herein, for each embodiment of the present disclosure shown and described, indicating direction are not made in limiting senses. For example, references to upper, lower, top, bottom, or lateral, are not provided to limit the manner in which the present technology can be implemented. While an upper surface is referenced, for example, the referenced surface need not be vertically upward, in the manufacturing or operating reference frame, or above any other particular component, and can be aside, below, etc., of some or all components instead, depending on the orientation used in the particular implementation.

As further example, reference to the first workpiece 102, as an upper or top workpiece, and the second workpiece 104 as a lower or bottom workpiece, are not made to limit the orientation by which the thermal-management system 100 can be implemented. The thermal-management system 100 can be implemented in a generally vertically orientation, for instance, whereby the upper workpiece 102 is vertically oriented and to the left or right of the 'lower' workpiece 104. The directional references are provided herein for ease of presentation and simplified description of the example drawings.

While each workpiece 102, 104 can have other shapes and dimensions without departing from the scope of the present technology, the workpieces are shown in FIG. 1 schematically as a generally rectangular profile, by way of example.

Workpieces 102, 104 are shaped and sized according to manufacturing or implementation requirements for the product that the workpieces will be parts of.

In some embodiments, one or both workpieces 102, 104 has a thickness 107 of between about 0.005 cm and about 2.0 cm.

Various sizes, shapes, and types (e.g., material) of workpieces 102, 104 can be used with the present thermal-management system 100. Example materials are described in more detail below, in the workpiece materials section (section IX.) below.

The thermal-management system 100 can include or be connected for operation to a fixture 106 adjacent the workpieces 102, 104 for welding, such as a fixture clamp component.

The micro heat exchanger 101 can have any of a wide variety of configurations without departing from the scope of the present technology. The micro heat exchanger 101 includes an internal compartment, such as one or more channels and/or chambers in which or through which thermal-management fluid, such as a chilled or heated nanofluid, or other suitable fluid, will be positioned or flow for cooling and heating applications, respectively.

FIG. 2 shows some example micro heat exchanger (MHE) arrangements, schematically, including various example channeling configurations. The first example MHE arrangement 200 includes a channel 202 extending simply generally linearly. The view shows a framing line 204. In some embodiments, the MHE includes a body or other structure, such as a body or stabilizers between channels, or portions of channeling, or such as structure connecting the channels or body to another part, such as the fixture 106 (shown in FIG. 1). The framing line 204 is provided schematically to represent any of many such cases.

While each MHE can have any of a wide variety of shapes and sizes, in various embodiments the MHE has a general length of between about 1 mm and about 100 mm (e.g., between about 5 mm and about 50 mm), a general width of between about 1 mm and about 100 mm (e.g., between about 5 mm and about 50 mm), and a general height of between about 0.1 mm and about 1 mm (e.g., between about 0.1 mm and about 0.3 mm).

The MHEs can include one or more of a wide variety of materials without departing from the scope of the present technology. Material must be configured to accommodate the fluid temperatures and any other effects to which the MHE may be exposed, such as thermal energy received directly or indirectly from the workpieces 102, 104 during welding.

In a contemplated embodiment, the MHE includes more than one material. The MHE can include, for instance, a first, more-conductive material, on a side or sides of the MHE that contact the workpiece(s) 102, 104, and a less-conductive material on a side or sides opposite ambient environment or otherwise not directly adjacent a workpiece during operation of the MHE. Example materials for the body of the MHE include steel, copper, aluminum, silicon, etc.

In operation of the MHE, the channel 202 carries the hot or cold fluid, indicated by reference numeral 205, between an input 206 and an output 208. The inputs and outputs, including example forms, or form factors, thereof, are described further below.

For simplicity, the hot or warm nanofluid 205 is referred to generally hereinafter as a 'hot' nanofluid (or 'hot fluid' to accommodate other types of appropriate fluids), without limiting the temperature that the warm fluid must have.

Generally, the 'hot' nanofluid has a temperature that is higher than a temperature of one, some, or all of the workpieces 102, 104.

A relatively cold, or cool nanofluid can be used, as referenced above, to expedite cooling of the workpieces 102, 104 and/or of the welded area (weld interface or joint). Cooling one or both of the workpieces 102, 104 joined has benefits, as mentioned, including avoiding damage to the workpiece(s) from becoming overheated or heated too long.

Cooling workpieces can also expedite manufacturing, such as by allowing subsequent working of the workpiece more quickly, or moving of the workpiece more quickly to subsequent stages or locations of the manufacturing process. In some welding scenarios, depending on the material forming the weld joint, for example, expedited, active cooling immediately after welding strengthens the joint being formed, resulting in a bond stronger than would be formed if the newly formed joint were allowed to cool slowly.

As mentioned, advantages of cooling, and particularly relatively rapid cooling of two dissimilar metals recently welded together includes inhibition of intermetallic compound formation or growth.

The chilled, cold or cool nanofluid can be referred to as 'cold nanofluid,' or 'cold fluid' to accommodate embodiments using other suitable fluids.

Generally, the 'cold' nanofluid 205 has a temperature that is lower than a temperature of one, some, or all of the workpieces 102, 104. The nanofluid 205 in these embodiments can thus be referred to as relatively cold, or relatively cool, being cold or cool with respect to the thermal context of one, some, or all of the workpieces 102, 104 and/or of the environment (e.g., ambient air temperature in the manufacturing environment).

In some implementations, one or both of the workpieces 102, 104 are initially, when introduced to the MHE, at an ambient manufacturing-environment temperature of between about 60 degrees Fahrenheit (F) and about 80 degrees F.

The nanofluid 205 can be heated or cooled to any temperature appropriate for the implementation. Considerations, for determining a temperature or temperature range to heat to or cool to, can include an amount and cost of energy required to obtain a target temperature, and the value of further heating or cooling—e.g., avoiding exceeding a temperature above which or below which there will be small or diminishing relative returns. Consideration could also be given to avoiding damage or otherwise unwanted alteration to the system and/or workpieces 102, 104.

In some embodiments, the nanofluid 205 is heated to either (i) a pre-determined temperature, (ii) a temperature within a pre-determined range, or (iii) a temperature that is above or below a pre-determined threshold temperature.

In some implementations, the nanofluid 205 is heated and controlled so as not exceed a maximum temperature, or not-to-exceed temperature. The controlling can be performed based on closed-loop feedback monitoring of the fluid temperature, for instance.

Likewise, in various implementations, the nanofluid 205 is cooled and controlled so as not to fall below a minimum temperature.

In some embodiments, the nanofluid 205 is heated to a temperature determined as a function of one or more factors. The factors can include a melting point of one or more components of the system 100, e.g., a body and/or a channel of the micro heat exchanger. A target heating temperature for the nanofluid 205 could be determined as a percentage of the melting point of the MHE body or a channel, for example, such as 70%.

As another example, the target heating temperature could be the melting point of the relevant body and/or a channel minus a specific or predetermined buffer, such as 50 Kelvin.

In one implementation, the target heating temperature for the nanofluid 205 could be a percentage of the melting point of the MHE body and/or a channel, and then raised or lowered by a certain amount. As an example, the target heating temperature could be 70% of the body melting point minus 50 Kelvin.

In another example, the factors can include a melting point of the workpieces 102, 104. A target heating temperature for the nanofluid 205 could be determined as a percentage of the melting point of one of the workpieces, for example. In one implementation, the target heating temperature for the nanofluid 205 could be a percentage of the melting point of the workpieces, and then raised or lowered by a certain amount. As an example, the target heating temperature could be 100% of the workpieces melting point minus 50 Kelvin.

In some embodiments, the nanofluid 205 is cooled to a temperature determined as a function of one or more factors. The factors can include a crystallization rate for one or both workpieces 102, 104, or any constituent parts thereof. A target cooling temperature for the nanofluid 205 could be, for example, determined as a cooling rate 10% faster than the rate of the crystallization for the workpiece(s) 102, 104.

In one implementation, the target cooling temperature for the nanofluid 205 is a temperature to achieve a desired or predetermined cooling rate of the workpiece, and then raised or lowered by a certain amount.

Nanofluid 205 is for some cooling implementations cooled to a rate faster than the crystallization rate of the one or both workpieces 102, 104.

With continued reference to FIG. 2, the second example MHE arrangement 210 includes a channel 212 having inputs 216 and outputs 218 positioned at or adjacent a common side of the MHE, e.g., of an MHE body 214. The inputs and outputs can be at respective valves on a common side of the MHE body 214. The channel 212 is shown configured in a generally "U" or "C" shape.

The third example MHE arrangement 220 includes a channel 222 distributed in a winding, or serpentine manner. The inputs 226 and outputs 228 are positioned at or adjacent a common same side of the MHE, e.g., of an MHE body 224. As in all embodiments, though, the MHE arrangement 220 can be configured in other ways to suit a particular implementation.

The fourth example MHE arrangement 230 includes a channel 232 distributed in a generally spiral manner. The inputs 236 and outputs 238 are again shown positioned at or adjacent a common same side of the MHE, e.g., of the body 234, but need not be positioned as such.

The fifth MHE arrangement 240 illustrates an example of how the exchanger in various embodiments can include multiple channels 242, 246. The multiple channels can be arranged in any desired manner within the exchanger. In the embodiment shown, a first channel 242 is distributed in a "U" or "C" shape, having an input and an output at the same side of the MHE. The second channel 246 has a winding, or serpentine, distribution having an input and an output at different, e.g., opposing, sides of the MHE.

The MHEs can be used for heating and/or cooling the workpiece(s) to be joined, being joined, and/or after being joined. A contemplated implementation for MHEs having multiple channels 242, 246 includes a cold fluid being passed through one of the channels and a hot fluid passing through another channel, whether simultaneously, for cooling and heating MHE functions respectively.

For MHEs having a single channel (e.g., MHEs 200, 210, 220, 230), hot and cold operations can be effected by passing a first fluid through the channel at a time. For instance, a pre-heating hot fluid can flow through the channel prior to and/or during welding, then be replaced, such as by flushing, by a cold fluid for late welding and/or post welding cooling, or vice versa—i.e., cold or cool fluid first, then hot or warm.

While for simplicity in these examples, the micro heat exchanger fluid channel(s) are shown schematically in a generally two-dimensional manner, distribution of the channel(s) can include the channel(s) extending in any direction, including in three-dimensions—such as into and out of the views of FIG. 2, along with back and forth as it extends downward, upward, diagonally, etc.

The thermal-management system 100 can include any one or more of a wide variety of materials without departing from the scope of the present technology. Material must be configured to accommodate the fluid temperatures and any other effects to which the thermal-management system 100 may be exposed, such as thermal energy provided, or received, directly or indirectly to or from the workpieces 102, 104. As an example, the micro heat exchanger fluid channel can include silicon, steel, copper, aluminum, etc.

The micro heat exchanger fluid channel or channels in the MHE (e.g., 202, 212, etc.) can have any of a variety of shapes and sizes. As an example, in various embodiments the channels are generally round, rounded (e.g., oval), square or otherwise rectangular in cross section, or have any other suitable geometry. Factors include enabling movement of the fluid through the channel as desired and fostering desired or predetermined thermal functions, such as convection into and out of the channel and nanofluid held in the channel.

In various embodiments, generally, the micro heat exchanger 101 is a relatively small device, comprising internal fluid channels having a diameter (inner or outer) measured in microns. While each channel can have any one or more diameters along its length, in various embodiments the micro heat exchanger fluid channel has an outside diameter 201 (shown in FIG. 2) of between about 1 μm and about 100 μm.

While each micro heat exchanger fluid channel can have any one or more thicknesses along its length, in one embodiment the fluid channel has a wall thickness of between about 10 nm and about 1000 nm.

One benefit of the channel being relatively small and having sufficient wall thickness for robust operation is that the fluid channel will not, or be less likely to, collapse in use.

With continued reference to FIG. 1, in various embodiments, the MHE 101 is connected to the fixture 106, either permanently or temporarily. As examples of permanent connections, the MHE 101 could be formed as part of the fixture 106 or connected to the fixture 106, such as soldered or glued to the fixture 106.

As an example of temporary connections, the MHE could be secured adjacent the fixture 106 by temporary forces, such as by being sandwiched between the fixture 106 and the workpiece, positioned as such by automated machinery (not shown), for instance.

As another example of temporary connections, the MHE could be connected to the fixture 106 generally by gravity, such as in an embodiment (not shown) in which the MHE 101 and fixture 106 are arranged with the MHE 101 directly atop the fixture 106 for the welding operation.

As still another example of a temporary connection in which the MHE could be connected to the fixture 106 generally by gravity, the MHE 101 and one of the workpieces 102, 104 could be arranged with the MHE 101 positioned directly atop the workpiece for the welding operation.

As another example of temporary connections, the MHE could be connected to the fixture 106 by a hook-and-loop or similar temperature connecting arrangement that is robust enough to handle the temperatures associated with MHE functions, or other such easily releasable connections.

In various embodiments, it is preferred for the MHE to directly contact the workpiece(s) 102, 104 that it is being arranged in the system 100 to cool or heat. For implementations involving clamping structure, such as by the fixture 106 being a first (e.g., upper) clamping structure, operating opposite a second (e.g., lower) clamping structure, such as a lower fixture, an anvil, table, or floor. One or both of the clamping structure can be configured to effect clamping force(s) pushing the MHE 101 toward the adjacent workpieces(s).

The configuration can include the MHE being biased toward a desired component or surface (e.g., welding fixture or workpiece surface), such as by being spring loaded, or adjustable by hinge, gear, screw turn, etc. The force can be initiated automatically, such as in the case of spring loading, for instance, or in response to a trigger. An example trigger is an actuator, such as that of automated machinery (e.g., robot).

Input and output components at and/or leading to the MHE, such as those indicated by reference numerals 206, 208 (FIG. 2), 136, 138 (FIG. 1) of each embodiment can take any of a wide variety of forms. The components may include valves, ports, manifold arrangements, couplings, combinations of these, or similar inlet or outlet features. The input and output components may be referenced at times herein as valves, for simplicity and not to limit the configurations and arrangements that these input/output components can take.

The inlet and outlet valves are used to add nanofluid, or other suitable fluid for the described thermal-control applications, to the MHE and retrieve or otherwise allow outflow of the fluid from the MHE, respectively.

The fluid can be moved through the MHE in any of a variety of ways including by one or more of pushing, such as by an upstream pump, pulling, such as by a downstream pump, gravity, convection or heat-gradient currents, capillary action, or a combination of any two or more of these.

Fluid can be added to the system according to any appropriate timing. One goal of replacing, or replenishing the fluid, is maintaining a desired in-MHE fluid temperature. Hot fluid, being positioned in the channel(s) and having an original target temperature, in heating the workpiece, by way of channel walls, itself cools due to loss of the energy causing heating of the workpiece(s) 102, 104. Replenishing fluid would thus return or maintain the general temperature of the fluid in the chamber to/at the original target temperature.

In some implementations, the fluid is added, and so removed, generally continuously to refresh the nanofluid with fluid of the desired temperature, to maintain the desired MHE temperature, for affecting temperature of the workpieces 102, 104 and the welding area as desired.

In one embodiment, a 'hot' fluid is passed through the MHE at a pre-determined flow rate to pre-heat the workpiece(s) 102, 104 before welding. Flow can continue at that rate or slow or stop once welding has started, during the welding, and/or after the welding.

In some embodiments, some or all of the fluid control aspects described are automated. The automated features may include, for instance, selectively heating or cooling the fluid, and selectively causing (e.g., pumping) the fluid to flow into or out of the MHE.

The fluid could also be altered in other ways, by automated machinery and/or personnel using tools, such as by changing a magnetic polarity of the fluid, changing the type or types of particles (e.g., nanoparticles) in the fluid, or by changing a concentration of any of the types of particles (e.g., nanoparticles) in the fluid, by adding or removing particles or base fluid to/from the fluid, and so changing a ratio of constituent parts of the nanofluid.

Example automated features are shown in FIG. 1. The automated features can include a controller 170. The controller 170 is configured and arranged for communication with one or both of a pump 172 and at least one fluid modification device (FMD) 174. The configuration and arrangement of the controller 170 can include wired or wireless connection to the pump 172 and/or FMD 174.

Fluid control can include monitoring of fluid characteristics, as mentioned, such as by closed-loop feedback. For instance, at least one sensor monitoring fluid temperature and/or other fluid characteristic (e.g., magnetic polarity, ratio of nanoparticles and base fluid) can be implemented at any of various portions of the arrangement. Example locations include any one or more of: an outlet of the FMD 174 (reference numeral $173^1$) an inlet of the FMD 174, and inlet to a reservoir 176, an outlet of the reservoir 176, an inlet of the sleeve system 100 (reference numeral $173^2$), and an outlet of the sleeve system 100. The feedback loop can have benefits for the controller including advising whether the FMD 174 is performing as it is being instructed to perform, whether the controller 170 is sending proper signals or should send different signals—e.g., a signal to heat more or change fluid composition in a different manner. The feedback can also promote efficiency, such as when the sensor is at the FMD inlet, in that the controller 170 can consider a particularly what change(s) need to be made to the fluid at the FMD 174 to reach a target fluid characteristic(s) predetermined at the controller 170 (e.g., target temperature and/or composition).

The controller 170, and the coding and functions thereof, are described further below in the controller section (section VIII.) below.

The thermal-management system 100 can include or be connected to the reservoir 176, holding the nanofluid, which may be heated or cooled at any level depending on system configuration and operation. The fluid is positioned in the reservoir 176 after it leaves the MHE and before it reenters the MHE.

At the reservoir 176, nanofluid can be added, removed, or replaced in various ways, such as in mass, in total, all at one time, or over a period of time. The fluid can also be adjusted by a fluid-modification device, described next.

As provided, any component shown by a single item in the figures can be replaced by multiple such items, and any multiple items can be replaced by a single item. Here, for instance, though a reservoir 176 is shown, the thermal-management system 100 can include or be connected to more than one reservoir 176.

Thus, in some embodiments, the thermal-management system 100 includes or is connected to more than one reservoir 176. The reservoirs 176 can hold the same or different types of nanofluids 205. The reservoirs 176 could also, whether holding the same or different types of nanofluid, maintain the nanofluids 205 at different temperatures. One of the reservoirs 176 could be a hot reservoir, for example, with the other being cold.

An FMD 174 can include a heater being part of or connected to a hot reservoir 176, and the FMD 174 can include a chiller being part of or connected to a cold reservoir 176.

As provided, any component shown by a single item in the figures can be replaced by multiple such items, and any multiple items can be replaced by a single item. Here, for instance, though a single pump 172 is shown, the thermal-management system 100 can include or be connected to more than one pump 172.

Similarly, while a single FMD 174 is shown, the system can include more than one.

The FMD 174 can be configured to alter the nanofluid 205 in any of a variety of ways toward accomplishing goals of the technology. The FMD 174 can include, e.g., a heater, for heating nanofluid 205 passing through the FMD 174 to a specified temperature before it is pumped into channel(s) of the MHE(s).

In one embodiment, the FMD 174 includes a chiller, or cooling device to cool nanofluid 205 passing through the FMD 174 to a specified temperature before it is pumped into the channel(s) of the MHE(s).

In one embodiment, the FMD 174 includes a material-adjusting component for changing a make-up or characteristic (other than by only heating and/or cooling) of the nanofluid 205. The material-adjusting component can be configured to, for example, alter the nanofluid 205 in one or more ways, such as by changing a magnetic polarity of the nanofluid 205, changing the type or types of nanoparticles in the nanofluid 205, or by changing a concentration of any of the types of nanoparticles in the fluid 205, by adding or removing nanoparticles and/or base fluid to/from the nanofluid 205, to obtain desired or predetermined fluid qualities.

In embodiments in which the FMD 174 illustrated represents more than one FMD 174, or an FMD 174 with various functions, the FMD 174 can include, for instance, any combination of a heater, a chiller, and a material-adjusting component.

The thermal-management system 100—e.g., the MHE—includes any appropriate piping, valves, switches, and the like for directing the nanofluid 205 between the various components described in operation of the thermal-management system 100.

With reference to FIG. 2, the intake, outtakes shown (e.g., 208, 206, 216, 218), which can comprise connecting structure (e.g., valve on the MHE body), can vary in design. They can be, for example, of any number, size, shape, and position within the thermal-management system 100 without departing from the scope of the present technology.

An intake valve may be positioned vertically above the corresponding outtake valve, for example, to harness gravity, thereby, lowering an amount of work needed to move the nanofluid 205 through the MHE, as compared to if the fluid flow were reversed—i.e., from a lower intake to a higher outtake.

In some implementations of the present technology, nanofluid 205 of one temperature and/or type is passed through the thermal-management system 100 at one time or time window in a welding process, and nanofluid 205 of another temperature and/or type is passed through the system 100 at another time or time window. This can include, for instance, passing 'hot' nanofluid 205 through the MHE in a pre-heating, pre-welding stage, and/or during welding, and then replacing the hot nanofluid in the MHE with 'cold' nanofluid 205 at any time during and/or after the welding energy is applied.

In one implementation, a first fluid of one type and/or temperature (e.g., a 'hot' temperature) is flushed out of the MHE by a second fluid of another type and/or temperature (e.g., a 'cold' temperature), thereby replacing the first fluid. In another implementation, flushing occurs in stages, such as by a fluid of one temperature and/or type (e.g., a 'hot' temperature) being flushed out substantially by an intermediate-type and/or intermediate-temperature fluid, and then the fluid of the other type or temperature (e.g., 'cold' temperature) is added.

In a contemplated embodiment, the same fluid used as the hot fluid is cooled rendering the cold fluid, instead of flushing, and/or vice versa—i.e., a cold fluid is used in the MHE, then heated, rendering the hot fluid, which is then passed through the MHE.

In another contemplated embodiment, the hot fluid is heated and/or maintained heated in one location (e.g., a first chamber) for use in pre-welding and/or during welding, and the cold fluid is chilled and/or maintained cold in a separate location (e.g., a second chamber) for use in the heat exchanger during and/or immediately post welding.

For embodiments in which the MHE has various channels, compartments, or sub-chambers, like the fourth example of FIG. 2 (MHE 240), more than one temperature of nanofluid 205 could be present in the MHE to accomplish respective functions—e.g., cooling for one, and heating for the other—such as in closely adjacent time windows in the welding process.

III. FIG. 3

FIG. 3 illustrates schematically a perspective view of a thermal-management system 300 comprising a micro heat exchanger 301 according to another embodiment of the present technology.

The micro heat exchanger 301 is positioned adjacent the second workpiece 104, which is adjacent the first workpiece 102.

The thermal-management system 300 also includes, or is used with one or more adjacent fixtures 302, 304, such as clamping fixtures. A top fixture 302 includes a window, or pass-through 306 through which welding energy is applied from other welding equipment—e.g., welding horn or head; not shown in FIG. 3).

In this embodiment shown, the lower fixture 304 includes a recess or compartment 308 sized and shaped to receive or otherwise hold in place the MHE 301.

As referenced above, this arrangement too can be configured so that the MHE 301 is biased toward at least one of the workpieces. In this example, the MHE 301 is biased toward the second workpiece 104 by forces including weight of the workpieces 102, 104 pushing them down toward the MHE 301 and/or inward clamping forces from the fixture ends 302, 304.

The embodiment of FIG. 3 can otherwise be like the embodiments described above and below, and every similarity is not repeated here. Processes for controlling micro heat exchanger fluid temperature (e.g., heating and/or cooling), flow, non-temperature qualities, and timing of changes thereof, can be made according to any of the techniques described herein, including those described in connection with FIG. 1.

IV. FIG. 4

FIG. 4 illustrates schematically a perspective view of a thermal-management system 400 comprising a micro heat exchanger according to another embodiment of the present technology.

The embodiment of FIG. 4 is similar in ways to the embodiment of FIG. 3. In FIG. 4, the MHE 401 extends partially (as shown) or fully around a target weld area 403.

Positioned as such, the MHE can heat and/or cool, depending on the application, at least one of the workpieces—e.g., primarily the top workpiece 102, and possibly the lower workpiece 104 indirectly, in the embodiment shown.

The embodiment of FIG. 4 can otherwise be like the embodiments described above and below, and every similarity is not repeated here. Processes for controlling micro heat exchanger fluid temperature (e.g., heating and/or cooling), flow, non-temperature qualities, and timing of changes thereof, can be made according to any of the techniques described herein, including those described in connection with FIG. 1.

V. FIG. 5

FIG. 5 illustrates schematically a side view of a thermal-management system 500 comprising multiple micro heat exchangers $501^1$, $501^2$, $501^3$ according to another embodiment of the present technology.

The system 500 includes any one or more of the multiple illustrated micro heat exchangers $501^1$, $501^2$, $501^3$. Each micro heat exchanger $501^1$, $501^2$, $501^3$ is positioned adjacent and, in various embodiments preferably in direct contact with, one or both of the workpieces 102, 104.

One or more of the workpieces 102, 104 and/or the micro heat exchangers $501^1$, $501^2$, $501^3$ are secured in place by fixtures 302, 304 or other structure, shown schematically in FIG. 3.

The embodiment shown is an example of the variety of shaping that the workpieces 102, 104 can have, with the upper workpiece 102 having an arched or bridged shape. And, likewise, an example of the flexibility permitted in deciding how may and where to positioned the MHE(s).

The embodiment of FIG. 5 can otherwise be like the embodiments described above and below, and every similarity is not repeated here. Processes for controlling micro heat exchanger fluid temperature (e.g., heating and/or cooling), flow, non-temperature qualities, and timing of changes thereof, can be made according to any of the techniques described herein, including those described in connection with FIG. 1.

VI. FIG. 6

FIG. 6 illustrates schematically a perspective view of a thermal-management system 600 comprising multiple micro heat exchanger $601^1$, $601^2$ according to another embodiment of the present technology.

The micro heat exchangers $601^1$, $601^2$ can be configured (e.g., sized and shaped) and arranged (e.g., positioned, oriented) in the system 600 to have a function of controlling relative spacing between parts—e.g., workpieces 102, 104—or a fit between parts.

FIG. 6 shows an example in which the MHEs $601^1$, $601^2$ are configured and arranged to serve a pre-determined separating or off-set function. Particularly, the MHEs $601^1$, $601^2$ are designed so that the MHEs $601^1$, $601^2$ separate the workpieces 102, 104 as needed or desired for the welding.

In various embodiments, the MHE or MHEs $601^1$, $601^2$ has a predetermined height to accomplish this function. While each MHE $601^1$, $601^2$ can have other heights without departing from the scope of the present technology, in various embodiments the heights of the MHE $601^1$, $601^2$, such as for laser welding, is between about 0.1 mm and about 0.2 mm—such as for an Aluminum first workpiece 102 and Aluminum second workpiece 104 arrangement (Al/Al).

A benefit of having such offset is off-gassing (e.g., ventilation) during the weld process. The MHE, as in all embodiments, can be designed—e.g., low component cost and/or manufacturing cost to make the MHE—to be removed after welding and reused in connection with a next set of workpieces, or can be disposable.

The workpieces 102, 104 are in various embodiments secured, directly or indirectly, such as by fixtures 302, 304. Example welding locations are indicated by reference numerals $403^1$, $403^2$.

The embodiment shown is another example of the variety of shapings that the workpieces 102, 104 can have, with teach of the upper and lower workpieces having a rounded arch or bend.

The embodiment shown in FIG. 6 is also another example of the flexibility in the ways and positioning with which the MHE can be positioned.

The embodiment of FIG. 6 can otherwise be like the embodiments described above and below, and every similarity is not repeated here. Processes for controlling micro heat exchanger fluid temperature (e.g., heating and/or cooling), flow, non-temperature qualities, and timing of changes thereof, can be made according to any of the techniques described herein, including those described in connection with FIG. 1.

VII. FIG. 7

FIG. 7 illustrates schematically a top plan view of a thermal-management system 700 comprising a micro heat exchanger 701 according to another embodiment of the present technology.

The micro heat exchanger (MHE) 701 is shown schematically to include channels 703. Weld locations are again indicated by reference numerals 403.

Particularly for the embodiment of FIG. 7, the example shows how the channels 703 can be patterned in any of various ways, as the embodiments of FIG. 2 further illustrate. In the case of FIG. 7, the channels 703 are shown in a hatched pattern or distribution.

The embodiment of FIG. 7 is considered to show how the MHE 701 can be located above or below the workpieces 102, 104. The MHE 701 is technically shown below the first workpiece 102, but can be above or below the first workpiece 102, and above or below the second workpiece 104.

Factors in determining positioning of the MHE 701 include, along with desired thermal characteristics (e.g., amount and location of heating or cooling the workpieces 102, 104), and ease of adding and removing the MHE 701 to/from its position adjacent the workpieces 102, 104 for operation in connection with the welding.

In some embodiments, the MHE 701 is left in place after the weld process, and in particular embodiments, is left there, remaining a part of the eventual product.

The embodiment of FIG. 7 can otherwise be like the embodiments described above and below, and every similarity is not repeated here. Processes for controlling micro heat exchanger fluid temperature (e.g., heating and/or cooling), flow, non-temperature qualities, and timing of changes thereof, can be made according to any of the techniques described herein, including those described in connection with FIG. 1.

VIII. FIG. 8

FIG. 8 shows an example controls system 800, such as a computing apparatus, or computer. The system 800 can constitute the controls 170, described above.

The controls system 800 includes a memory, or computer-readable medium 802, such as volatile medium, non-volatile medium, removable medium, and non-removable medium. The term computer-readable media and variants thereof, as used in the specification and claims, refer to tangible, non-transitory, storage media.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controls system 800 also includes a computer processor 804 connected or connectable to the computer-readable medium 802 by way of a communication link 806, such as a computer bus.

The computer-readable medium 802 includes computer-executable code or instructions 808. The computer-executable instructions 808 are executable by the processor 804 to cause the processor, and thus the controller 800, to perform any combination of the functions described in the present technology.

Example functions or operations described include controlling a temperature of nanofluid being introduced to the thermal-management system of any of the embodiments shown and described. Another example function is changing nanofluid composition in a pre-determined manner to expedite or otherwise effect as desired a heating or cooling process. Another example function includes controlling a flow or flow rate by which the nanofluid is caused to flow through any of the example thermal management systems described or shown.

The code or instructions 808 can be divided into modules to perform various tasks separately or in any combination. The module can be referred to by any convenient terminology. One module, configured with code to control one or more characteristics of the nanofluid using an FMD, could be referred to as a fluid-modification module, a fluid-characteristic-control module, or the like, for instance.

The controller 800 can also include a communications interface 810, such as a wired or wireless connection and supporting structure, such as a wireless transceiver. The communications interface 810 facilitates communications between the controller 800 and one or more external devices or systems 812, whether remote or local.

The external devices 812 can include, for instance, a remote server to which the controls system 800 submits requests for data and/or from which the controls system 800 receives updates or instructions. The external device 812 could include a computer from which the control system 800 receives operating parameters, such as target temperatures for the nanofluid(s), other characteristics for or related to the fluid, heating or cooling times, nanofluid flow rates or flow/switch timing, or another system characteristic.

IX. WORKPIECE MATERIALS

As mentioned, various types of workpieces 102, 104 can be used with the present thermal-management systems.

The workpieces 102, 104 being welded together can be similar or dissimilar, as mentioned. Regarding dissimilar workpiece materials, one workpiece can be a plastic or other polymer, for instance, and the other can be steel, aluminum, an alloy, or other metal. The teachings of the present technology can be used to join a polymer (e.g., polymeric composite) to another polymer, or to join a polymer to a metal, for instance.

In one embodiment, the material of one or both of the workpieces 102, 104 includes polyethylene. In various implementations, the material includes polyethylene terephthalate (PET), high density polyethylene (HDPE) and/or ethylene vinyl alcohol (EVOH).

In one embodiment, at least one of the workpieces 102, 104 being joined includes a polymer. At least one of the workpieces 102, 104 can include synthetic, or inorganic, molecules. While use of so-called biopolymers (or, green polymers) is increasing, petroleum based polymers are still much more common.

Material of one or both workpieces 102, 104 may also include recycled material, such as a polybutylene terephthalate (PBT) polymer, which is about eighty-five percent post-consumer polyethylene terephthalate (PET).

In one embodiment one or both of the workpieces 102, 104 includes some sort of plastic. In one embodiment, the material includes a thermo-plastic.

In one embodiment one or both of the workpieces 102, 104 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material of one or both workpieces 102, 104 in some implementations includes a polyamide-grade polymer, which can be referred to generally as a polyamide.

Material of one or both workpieces 102, 104 may also include includes polyvinyl chloride (PVC).

In one embodiment, the material of one or both workpieces 102, 104 includes acrylonitrile-butadiene-styrene (ABS).

In one embodiment, the material of one or both workpieces 102, 104 includes a polycarbonate (PC).

Material of one or both workpieces 102, 104 may also comprise a type of resin. Example resins include a fiberglass polypropylene (PP) resin, a PC/PBT resin, and a PC/ABS resin.

The workpieces 102, 104 may be pre-processed, such as heated and compression molded prior to the welding.

As mentioned, any of the operations can be performed, initiated, or otherwise facilitated by automated machinery, such as robotics. A robot (not shown in detail) can be configured and arranged to be controlled to prepare the workpieces 102, 104 (e.g., treat, coat, adjust the material, shape or size, etc.) position one or both workpieces 102, 104 adjacent any of the thermal-management systems, for instance, and/or position such system or such component(s) adjacent the workpiece(s).

A robot could also control the welding equipment, or the welding equipment itself can itself be automated, or robotic.

Any such automated machinery in one embodiment is controlled by a controller, such as by any of the controller embodiments described above primarily in connection with FIGS. 1 and 8.

X. MICRO HEAT EXCHANGER COOLING OF WELDING EQUIPMENT

As mentioned, aspects of the present technology relate to cooling welding equipment using a relatively cold nanofluid positioned in (e.g., passing through) a compartment adjacent the equipment.

A primary welding-equipment component for cooling, or chilling, is a welding head. In operation of a fusion- or laser-type welding apparatus, for instance, a laser head heats while emitting laser rays for forming the weld. Without cooling, performance of the head could degrade or the head could be damaged.

In one embodiment, a wall of the compartment contacts a portion—e.g., welding head—of the welding equipment being cooled. In a contemplated implementation, the compartment is configured and arranged—e.g., connected to and/or connected to the welding equipment—so that the cooling fluid contacts directly the portion—e.g., welding head—of the welding equipment being cooled.

The cooling component can be, include, or be a part of what can be referred to as a heat exchanger. For smaller-scale implementations, the cooling apparatus can be referred to as a micro-heat exchanger.

XI. EXAMPLE FLUID ENGINEERING AND TYPES

Nanofluids are engineered colloidal suspensions of nanometer-sized particles in a base fluid. The nanoparticles are typically metals, oxides, carbides, or carbon nanotubes. Example base fluids include water, ethylene glycol, and oil.

Nanofluids are made to have unique properties, such as super-cooling or super-heating characteristics. A nanofluid could be engineered to have a thermal conductivity and convective-heat-transfer coefficient that are greatly enhanced over that of the base fluid, alone, for example. Engineering the fluid can include, for instance, magnetically polarizing the nanoparticles to obtain the desired qualities.

While the nanofluid can include other nanoparticles without departing from the scope of the present technology, in various embodiments, the nanofluid includes one or a combination of silicon nanoparticles and metal-based nanoparticles.

The nanofluid is for some implementations, surface functionalized. Surface functionalization of nanoparticles involves introducing functional groups (e.g., OH, COOH, polymer chains, etc.) to a surface of a nanoparticle. One characteristic of surface-functionalized nanofluids is increased particle dispersion in the nanofluid. Increased particle dispersion can be beneficial because it leads to increased thermal capacity, increased dispersion of thermal energy and increased longevity of nanoparticle suspension. Another result is that conductive nanoparticles can be isolated using surface functionalization, which can beneficially results in or be related to increased control over particle density in the fluid.

As also mentioned, while nanofluids are discussed herein as the primary fluid for use in the present systems, other fluids able to perform as desired can be used. The fluids can include, e.g., microfluids, having micro-sized particles in a base fluid.

XII. SELECT BENEFITS OF THE PRESENT TECHNOLOGY

Many of the benefits and advantages of the present technology are described herein above. The present section restates some of those and references some others. The benefits are provided by way of example, and are not exhaustive of the benefits of the present technology.

The thermal-management systems of the present technology, including micro heat exchangers to cool and/or heat workpieces being welded together, in various embodiments, allow efficient exchange of thermal energy during fusion welding or other joining methods.

The thermal-management systems, including micro heat exchangers, in various embodiments, allow active, efficient, and in some embodiments selective pre-heating, using nanofluid, of one or both workpieces being joined by welding. The thermal-management systems of the present technology, in various embodiments, allow active, efficient, and in some embodiments selective preheating a joining/welding interface or joint formed or being formed between the workpieces. The pre-heating reduces the amount of energy needed from the welding energy applicator (e.g., ultrasonic horn or laser head). The pre-heating also expedites the welding step.

The thermal-management systems, including micro heat exchangers, in various embodiments, allows active, efficient, effective, and select cooling, or chilling, using nanofluid, of one or both workpieces. The thermal-management systems of the present technology, in various embodiments, allows active, efficient, effective, and select cooling, or chilling, using nanofluid, of a joining/welding interface or joint formed or being formed between the workpieces, after the welding. Benefits of such cooling (e.g., rapid cooling or chilling) after welding can include, in implementations in which the workpieces includes metal and particularly different metals than each other. The technology can thus be an enabler of, or facilitate, joining dissimilar metals by inhibiting intermetallic growth.

Another benefit of various embodiments is an ability to heat and cool the same workpieces, selectively, as deemed appropriate, during the same welding process. The functions can include, e.g., pre-heating the workpiece(s) using the nanofluids before and during welding, and then cooling the workpiece(s) thereafter using another batch of nanofluid.

For embodiments by which one or both workpieces are pre-heated, benefits include shortening the weld cycle time, and facilitating formation of a high quality and robust weld.

Benefits of chilling a welding equipment component, such as a laser-welding head, include effectively reducing the footprint of the chiller. This is because of higher heat exchange rates.

XIII. CONCLUSION

Various embodiments of the present technology are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A thermal-management system, for use in controlling temperature of at least a first workpiece of multiple workpieces being joined by welding, comprising:
    a micro heat exchanger comprising:
        a first heat-transfer fluid tube extending between a first fluid-tube inlet and a first fluid-tube outlet; and
        a second heat-transfer fluid tube, unconnected fluidly from the first heat-transfer fluid tube, extending between a second fluid-tube inlet and a second fluid-tube outlet;
    wherein:
        the first heat-transfer fluid tube is configured to receive heat-transfer fluid via the first fluid-tube inlet and channel heat-transfer fluid, from the first fluid-tube inlet, through a first heat-transfer fluid-tube section, and to the first fluid-tube outlet, in operation of the thermal-management system;
        the second heat-transfer fluid tube is configured to receive heat-transfer fluid via the second fluid-tube inlet and channel heat-transfer fluid, from the second fluid-tube inlet, through a second heat-transfer fluid tube section, and to the second fluid-tube outlet, in operation of the thermal-management system;
        the first heat-transfer fluid tube is sized and shaped to be positioned adjacent at least the first workpiece to cool or heat at least the first workpiece when the heat-transfer fluid is channeled through the first heat-transfer fluid-tube section in operation of the thermal-management system; and
        the second fluid-tube inlet and second fluid-tube outlet channel heat-transfer fluid through the thermal-management system to heat or cool the at least one workpiece during operation of the system.

2. The thermal-management system of claim 1 further comprising a welding fixture comprises a compartment for receiving the micro heat exchanger, wherein the micro heat exchanger is sized and shaped to fit within the compartment.

3. The thermal-management system of claim 1 wherein:
    the system further comprises a body to which the first heat-transfer fluid tube is connected; and
    the second fluid-tube inlet is connected to the body and a second fluid-tube outlet connected to the body.

4. The thermal-management system of claim 1 wherein the micro heat exchanger is connected to a welding fixture.

5. The thermal-management system of claim 1 wherein the micro heat exchanger is sized and shaped to be positioned adjacent the first workpiece for operation of the thermal-management system.

6. The thermal-management system of claim 1 further comprising two fixtures configured to be positioned on opposite sides of the workpieces being joined, wherein the micro heat exchanger, the fixtures, and the workpieces, are sized and shaped so that the micro heat exchanger can be positioned between the two fixtures and adjacent the first workpiece, to heat or cool the first workpiece, during operation of the thermal-management system.

7. The thermal-management system of claim 6 wherein at least one of the two fixtures comprises a welding-access port sized, shaped, and arranged on at least one of the two fixtures to allow welding of the workpieces through the welding-access port while the fixtures are positioned adjacent the workpieces.

8. The thermal-management system of claim 6 further comprising a linking component configured to connect a first fixture of the two fixtures to a second fixture of the two fixtures while the micro heat exchanger is positioned snugly between the first and second fixtures and adjacent the first workpiece.

9. The thermal-management system of claim 1 further comprising at least one fixture, wherein the micro heat exchanger, the fixture, and at least the first workpiece, are sized and shaped so that the micro heat exchanger can be held snugly against the first workpiece using the fixture, to heat or cool the first workpiece, during operation of the thermal-management system.

10. The thermal-management system of claim 1 further comprising:
    a welding fixture having a welding-access port sized, shaped, and arranged on the fixture to allow welding of the workpieces through the welding-access port while the fixture is positioned adjacent the workpieces;
    wherein the welding-access port and micro heat exchanger are sized and shaped so that the micro heat exchanger at least partially surrounds the welding-access port when the fixture and micro heat exchanger are positioned adjacent each other and adjacent the workpieces for welding the workpieces in operation of the thermal-management system.

11. The thermal-management system of claim 1, wherein the first heat-transfer fluid tube or the second heat-transfer fluid tube is disposed in a predetermined pattern selected from a group consisting of:
    cross-hatched;
    a pin;
    a spiral or helicoid;
    manifold;
    serpentine;
    parallel; and
    interdigitated.

12. The thermal-management system of claim 1, wherein the heat-transfer fluid is surface functionalized, yielding a surface-functionalized heat-transfer fluid, to, in operation of the system, cool or heat the first workpiece in a predetermined manner.

13. The thermal-management system of claim 12 wherein the surface-functionalized heat-transfer fluid comprises nanoparticles and at least one property selected from a group consisting of:
    being surface-functionalized by addition of a functional group at a surface of the nanoparticles; and
    the nanoparticles have more particle dispersion, or are more isolated, than nanoparticles of the heat-transfer fluid if not surface functionalized.

14. The thermal-management system of claim 12 further comprising the heat-transfer fluid, wherein the heat-transfer fluid comprises silicon (Si) nanoparticles with a base fluid.

15. The thermal-management system of claim 1 further comprising a fluid modification device in fluid communication with the at least one of the first or second heat-transfer fluid tubes, the fluid modification device being configured to, in operation of the thermal-management system, modify at least one characteristic associated with the heat-transfer fluid in a predetermined manner to cool or heat the first workpiece more effectively than the heat-transfer fluid would if not modified.

16. The thermal-management system of claim 15 further comprising a computerized controller configured for wired or wireless communication with the fluid modification device, and to send a signal to the fluid modification device causing the fluid modification device to modify said characteristic.

17. The thermal-management system of claim 15 wherein said characteristic comprises at least one of:
a magnetic polarity of the heat-transfer fluid;
a type of nanoparticles in the heat-transfer fluid;
a concentration of nanoparticles in the heat-transfer fluid;
a ratio of base fluid-to-nanoparticles of the heat-transfer fluid;
temperature of the heat-transfer fluid; and
flow rate of the heat-transfer fluid through the first or second heat-transfer fluid tubes.

18. A method, for controlling temperature of at least a first workpiece of multiple workpieces being welded together, comprising:
positioning a first workpiece, of the multiple workpieces, and a micro heat exchanger adjacent each other, the micro heat exchanger comprising:
a first heat-transfer fluid tube extending between a first fluid-tube inlet and a first fluid-tube outlet; and
a second heat-transfer fluid tube, unconnected fluidly from the first heat-transfer fluid tube, extending between a second fluid-tube inlet and a second fluid-tube outlet,
wherein:
the first heat-transfer fluid tube is configured to receive heat-transfer fluid via the first fluid-tube inlet and channel heat-transfer fluid, from the first fluid-tube inlet, through a first heat-transfer fluid-tube section, and to the first fluid-tube outlet;
the second heat-transfer fluid tube is configured to receive heat-transfer fluid via the second fluid-tube inlet and channel heat-transfer fluid, from the second fluid-tube inlet, through a second heat-transfer fluid tube section, and to the second fluid-tube outlet;
positioning a second workpiece, of the multiple workpieces, adjacent the first workpiece; and
passing a heat-transfer fluid through the first heat-transfer fluid tube or the second heat-transfer fluid tube, wherein the heat-transfer fluid is either:
heated, thereby heating the first heat-transfer fluid tube or the second heat-transfer fluid tube and, by the first or second heat-transfer fluid tube, the first workpiece; or
cooled in order to cool, by way of the first heat-transfer fluid tube or the second heat-transfer fluid tube, the first workpiece or material joining the first workpiece and the second workpiece while and/or immediately after welding the workpieces together.

19. The method of claim 18, further comprising:
controlling a fluid modification device, connected fluidly with the first or second heat-transfer fluid tube, to, before or while heat-transfer fluid is introduced to the micro heat exchanger, modify at least one characteristic of the heat-transfer fluid in a predetermined manner to cool or heat more effectively than the heat-transfer fluid would if not modified, wherein said characteristic comprises at least one of:
a magnetic polarity of the heat-transfer fluid;
a type of nanoparticles in the heat-transfer fluid;
a concentration of nanoparticles in the heat-transfer fluid;
a ratio of base fluid-to-nanoparticles of the heat-transfer fluid;
temperature of the heat-transfer fluid; and
flow rate of the heat-transfer fluid through the first or second fluid tube.

* * * * *